US012397404B2

(12) United States Patent
McConeghy et al.

(10) Patent No.: US 12,397,404 B2
(45) Date of Patent: Aug. 26, 2025

(54) OPERATING MODE DETECTION SYSTEM FOR ROTARY HAMMER

(71) Applicant: MILWAUKEE ELECTRIC TOOL CORPORATION, Brookfield, WI (US)

(72) Inventors: Ian McConeghy, Mequon, WI (US); Bryan C. Kendall, Lisbon, WI (US); Jesse Gibb, Milwaukee, WI (US); Jeffery D. Spraggon, Pewaukee, WI (US); Matt Lombardo, Muskego, WI (US); Hunter Wiehe, Milwaukee, WI (US); Spencer D. Stingl, Wauwatosa, WI (US); Alan J. Rehfeldt, Oak Creek, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/669,728

(22) Filed: May 21, 2024

(65) Prior Publication Data

US 2024/0399550 A1 Dec. 5, 2024

Related U.S. Application Data

(60) Provisional application No. 63/582,991, filed on Sep. 15, 2023, provisional application No. 63/505,023, filed on May 30, 2023.

(51) Int. Cl.
*B25D 16/00* (2006.01)

(52) U.S. Cl.
CPC .... *B25D 16/006* (2013.01); *B25D 2216/0084* (2013.01); *B25D 2250/141* (2013.01); *B25D 2250/195* (2013.01); *B25D 2250/221* (2013.01)

(58) Field of Classification Search
CPC ................ B25D 16/006; B25D 17/043; B25D 2250/221; B25D 2216/0023;
(Continued)

(56) References Cited

U.S. PATENT DOCUMENTS

| | | | |
|---|---|---|---|
| 6,766,868 | B2 | 7/2004 | Frauhammer et al. |
| 6,868,919 | B1 | 3/2005 | Manschitz et al. |

(Continued)

FOREIGN PATENT DOCUMENTS

| | | |
|---|---|---|
| CN | 105880685 A | 8/2016 |
| CN | 108453675 A | 8/2018 |

(Continued)

*Primary Examiner* — Nathaniel C Chukwurah
(74) *Attorney, Agent, or Firm* — Quarles & Brady LLP

(57) ABSTRACT

A rotary hammer includes a housing and a mode selection dial supported in the housing. The mode selection dial includes a cam. The housing supports a motor providing a rotational output. The housing supports a linkage moveable between a first position and a second position in response to engagement by the cam. A loss-of-control detection system measures acceleration of the housing and disables the motor upon the acceleration exceeding an acceleration threshold. The housing supports an operating mode detection system including a magnet and a Hall-effect sensor. The magnet is coupled to the linkage and moveable therewith between a third position corresponding to the first position of the linkage and a fourth position corresponding to the second position of the linkage. The Hall-effect sensor provides an output signal indictive of the position of the magnet. The loss-of-control detection system is selectively disabled based upon the output signal.

20 Claims, 12 Drawing Sheets

(58) Field of Classification Search
CPC ........ B25D 2250/255; B25D 2250/261; B25D 2216/0084; B25D 2250/121
See application file for complete search history.

(56) References Cited

U.S. PATENT DOCUMENTS

| | | | |
|---|---|---|---|
| 7,320,368 | B2 | 1/2008 | Watanabe |
| 7,398,834 | B2 | 7/2008 | Jung et al. |
| 7,845,426 | B2 | 12/2010 | Jung et al. |
| 9,010,455 | B2 | 4/2015 | Jung et al. |
| 9,180,585 | B2 | 11/2015 | Jung et al. |
| 9,254,562 | B2 | 2/2016 | Furusawa et al. |
| 10,322,502 | B2 | 6/2019 | Wirnitzer et al. |
| 10,414,033 | B2 | 9/2019 | Ekstrom et al. |
| 10,589,413 | B2 | 3/2020 | Goble |
| 10,615,670 | B2 | 4/2020 | Madineni et al. |
| 10,786,893 | B2 * | 9/2020 | Nitsch .................. B25D 17/043 |
| 11,059,156 | B2 | 7/2021 | Abe et al. |
| 11,192,232 | B2 | 12/2021 | Goble |
| 11,285,594 | B2 | 3/2022 | Gumpert et al. |
| 11,787,030 | B2 | 10/2023 | Wirnitzer et al. |
| 2006/0185865 | A1 | 8/2006 | Jung et al. |
| 2009/0183888 | A1 | 7/2009 | Forster et al. |
| 2010/0289484 | A1 | 11/2010 | Quinn |
| 2012/0255752 | A1 | 10/2012 | Aoki |
| 2016/0089757 | A1 | 3/2016 | Wirnitzer et al. |
| 2018/0015603 | A1 * | 1/2018 | Abe .......................... H02P 3/08 |
| 2020/0235643 | A1 | 7/2020 | Madineni et al. |
| 2021/0039231 | A1 | 2/2021 | Araki et al. |
| 2021/0039240 | A1 | 2/2021 | Iida |
| 2021/0078146 | A1 | 3/2021 | Araki et al. |
| 2022/0001526 | A1 | 1/2022 | Wang et al. |
| 2022/0105616 | A1 | 4/2022 | Wirnitzer et al. |
| 2022/0176534 | A1 | 6/2022 | Billings et al. |
| 2022/0219309 | A1 | 7/2022 | Billings et al. |
| 2022/0297279 | A1 | 9/2022 | Abbott et al. |
| 2022/0395971 | A1 | 12/2022 | Iida et al. |
| 2022/0395972 | A1 * | 12/2022 | Iida ...................... B25D 16/006 |

FOREIGN PATENT DOCUMENTS

| | | | |
|---|---|---|---|
| CN | 208289833 | U | 12/2018 |
| CN | 110524493 | A | 12/2019 |
| CN | 212445065 | U | 2/2021 |
| CN | 114074312 | A | 2/2022 |
| DE | 19720947 | A1 | 12/1997 |
| DE | 102019200522 | A1 | 7/2020 |
| WO | 2018020839 | A1 | 2/2018 |
| WO | 2022247813 | A1 | 12/2022 |

* cited by examiner

OPERATING MODE DETECTION SYSTEM FOR ROTARY HAMMER

CROSS-REFERENCE TO RELATED APPLICATIONS

This application claims priority to U.S. Provisional Patent Application No. 63/582,991 filed on Sep. 15, 2023 and U.S. Provisional Patent Application No. 63/505,023 filed on May 30, 2023, the entire contents of each of which are incorporated herein by reference.

FIELD OF THE INVENTION

The present disclosure relates to rotary hammers, and more particularly to an operating mode detection system of the rotary hammer.

SUMMARY OF THE INVENTION

The disclosure provides a rotary hammer configured to produce concurrent rotational and axial motion of a tool bit having a loss of control detection system and an operating mode detection system. The loss of control detection system is deactivated based on the operating mode of the tool, as detected by the operating mode detection system.

The disclosure provides, in another aspect, a rotary hammer operable in a first mode in which only a hammering operation to reciprocate a tool bit along a drive axis is performed, and a second mode in which the tool bit is rotationally driven about the drive axis. The rotary hammer includes a housing, a mode selection dial, a motor, a linkage, a loss-of-control detection system, and an operating mode detection system. The mode selection dial is supported in the housing and is moveable among a plurality of positions indicative of the first and second modes. The mode selection dial includes a cam. The motor is supported in the housing and provides a rotational output. The linkage is supported in the housing and is moveable between first and second positions in response to engagement by the cam. The loss-of-control detection system is configured to measure acceleration of the housing and disable the motor upon the acceleration exceeding an acceleration threshold. The operating mode detection system is supported in the housing and includes a magnet and a Hall-effect sensor. The magnet is coupled to the linkage and is moveable therewith between a third position corresponding to the first position of the linkage, and a fourth position, corresponding to the second position of the linkage. The Hall-effect sensor is coupled to the housing and provides an output signal that is indicative of the position of the magnet. The loss-of-control detection system is selectively disabled based on the output signal.

The disclosure provides, in another aspect, a rotary hammer including a housing, a sensor coupled to the housing, a mode selection dial, a motor, a transmission, a linkage supported in the housing, a controller, and an operating mode detection system. The sensor is configured to provide a parameter signal indicative of a measured parameter of the housing about a drive axis. The mode selection dial includes a cam and is supported in the housing and is moveable among a plurality positions indicative of first and second modes of operation. The motor is supported in the housing and provides a rotational output. The transmission is supported in the housing and is configured to receive the rotational output from the motor and selectively provides a rotational transmission output to the tool bit. The linkage is moveable between first and second positions in response to engagement by the cam. The controller includes a loss-of-control detection system configured to receive the parameter signal and compare the parameter signal to a parameter threshold. The controller is operable to disable the motor upon the parameter signal exceeding the parameter threshold. The operating mode detection system includes a magnet that is coupled to and moveable with the linkage, and a Hall-effect sensor coupled to the housing and provides an output signal indicative of the position of the magnet. The loss-of-control detection system is disabled upon disabling of the rotational transmission output to the tool bit.

The disclosure provides, in another aspect, a rotary hammer including a housing, a mode selection dial supported in the housing, a motor, an impact mechanism, a linkage supported in the housing, a controller, and an operating mode detection system including a magnet and a Hall-effect sensor. The mode selection dial is rotatable among a plurality of positions indicative of the operating modes, including a first, hammering operation, and a second mode in which only a drilling operation is performed. The mode selection dial includes a cam. The motor is supported in the housing and provides a rotational output received by the impact mechanism which transfers the rotational output to successive reciprocations thereby performing the first mode. The impact mechanism is selectively activatable by the mode selection dial. The linkage is moveable between first and second positions based on engagement by the cam. The controller includes a loss-of-control detection system configured to disable the motor upon acceleration of the housing exceeding an acceleration threshold. The magnet is coupled to the linkage and is moveable therewith. The Hall-effect sensor is coupled to the housing and provides an output signal to the controller indicative of the position of the magnet. The Hall-effect sensor is closer to the magnet when the linkage is in the second position that when the linkage is in the first position.

Other features and aspects of the subject matter will become apparent by consideration of the following detailed description and accompanying drawings.

Before any embodiments of the subject matter are explained in detail, it is to be understood that the subject matter is not limited in its application to the details of construction and the arrangement of components set forth in the following description or illustrated in the following drawings. The subject matter is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
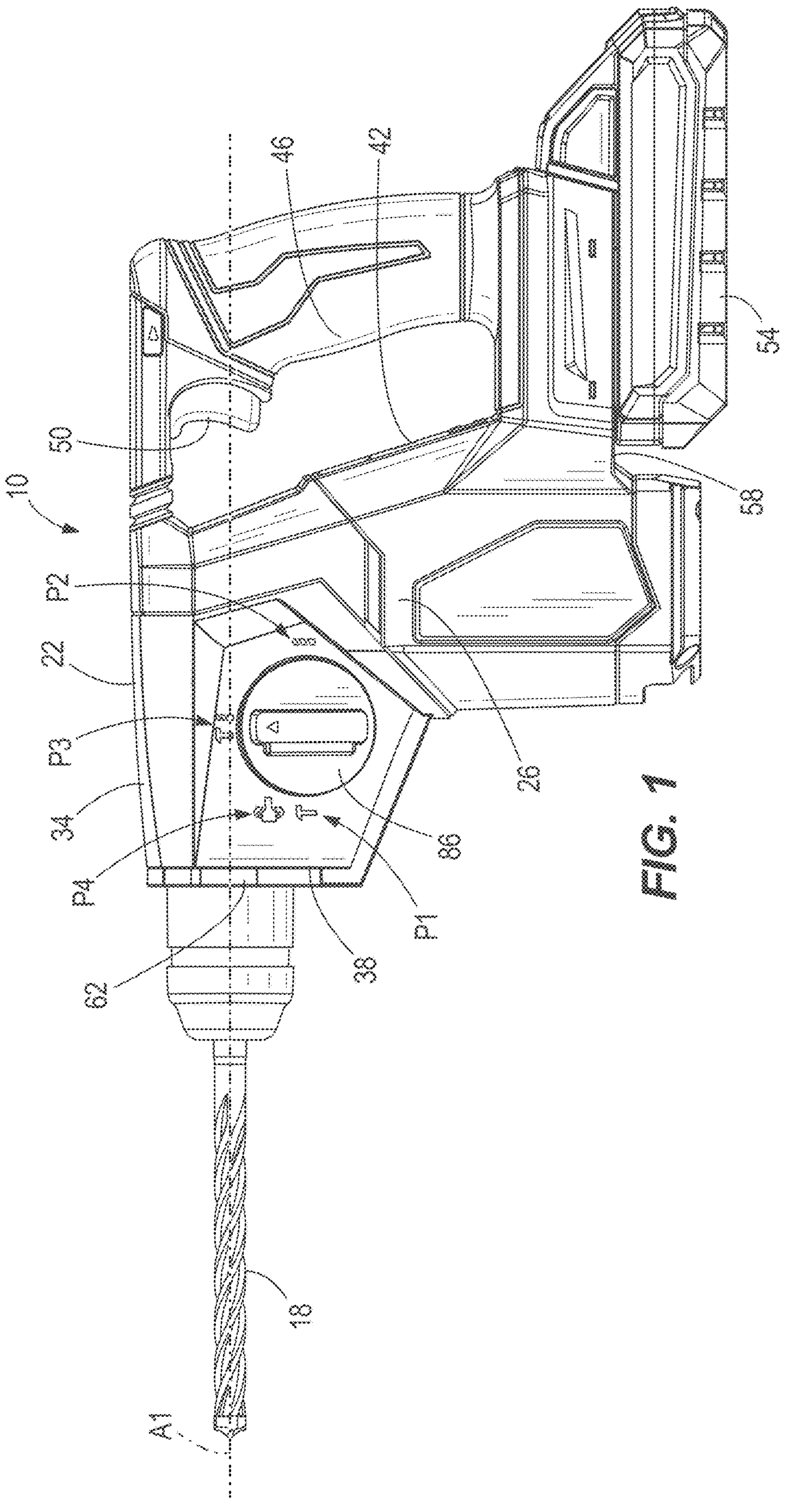
FIG. 1 is a first embodiment of a rotary hammer according to the present disclosure.
Figure 2:
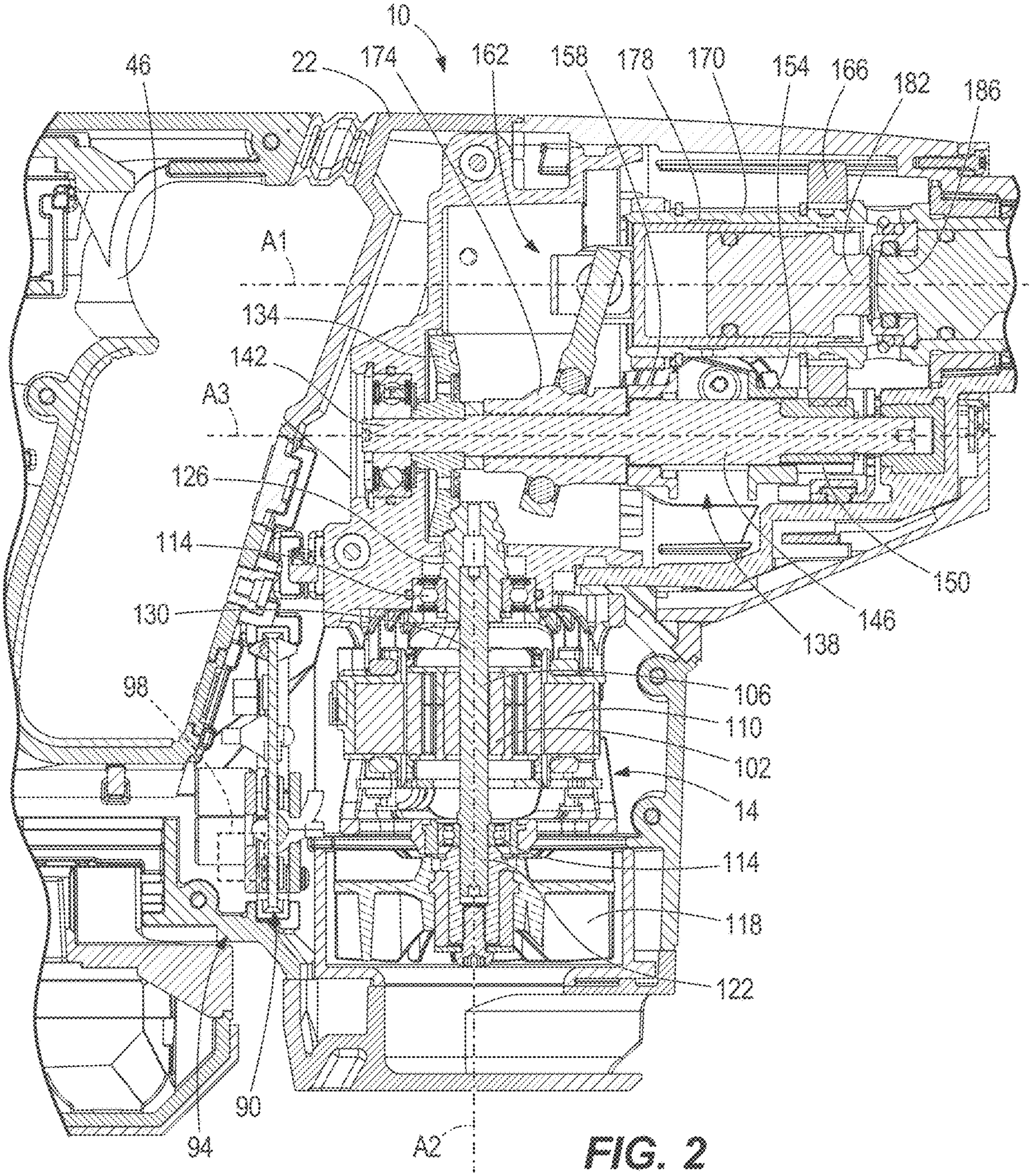
FIG. 2 is a section view of a portion of the rotary hammer of FIG. 1.

With reference to FIGS. 1 and 2, a first embodiment of a tool (e.g., a rotary hammer 10) that is operable to convert a rotational motion of a motor 14 into concurrent rotational and axial motion of a tool bit 18 along a drive axis A1 is illustrated. The illustrated rotary hammer 10 is operable in four modes: (1) a hammer-only mode in which only a hammering operation, that is, the tool bit 18 is only reciprocated along the drive axis A1, is performed by the rotary hammer 10; (2) a drill-only mode in which only a drilling operation, rotation of the tool bit 18 about the drive axis A1, is performed by the rotary hammer 10; (3) a hammer-drill mode, in which the hammering operation and the drill operation are performed concurrently by the rotary hammer 10; and (4) a chisel-adjustment, or chisel-rotate mode, in which the tool bit 18 is rotatable about the drive axis A1 by the user but rotational output of the motor 14 is not transmitted to the tool bit 18 and only the hammering operation is performed. The tool bit 18 is illustrated as a drill bit, however other types of bits (e.g., a chisel bit) can be substituted in place of the drill bit, depending on the application in which the user is operating the rotary hammer 10.

The rotary hammer 10 has a housing 22 with sides (left side 26 shown, right side not shown, but similar to left side), a top 34 joining the sides 26, and a front 38 from which tool bit 18 extends. The rear 42 of the housing 22 includes a handle 46 from which a trigger 50, which activates the rotary hammer 10, extends. A power source 54 (e.g., a battery pack, such as a rechargeable battery pack having a voltage capacity of 12V, 18V, or other voltage capacity) is coupled to the housing 22 adjacent the bottom 58 of the housing 22.

The housing 22 includes a lighting ring 62 (shown in FIGS. 7 and 8) disposed at the front 38 of the housing 22. The lighting ring 62 includes a plurality of light emitting diodes 66 (LEDs, e.g., three LEDs) each supported on a printed circuit board (LED PCB 70). The lighting ring 62 defines a channel 74 that runs along an extension portion 78 of the lighting ring 62 that extends from an annular portion 82 in which the LEDs 66 are located. Power wires 84 for the LEDs 66 are routed within the channel 74 and interconnect the LED PCBs 70 and a controller 90. The LEDs 66 are directed toward the tool bit 18 to illuminate the tool bit 18 and workspace surrounding the tool bit 18.

With reference to FIG. 2, the controller 90 is supported in the housing 22 in a direction rearward (i.e., toward the handle 46, toward the left side of the page, as illustrated in FIG. 2) of the motor 14. The controller 90 is configured to control operation of the rotary hammer 10. The controller 90 includes a loss-of-control detection system 94 ("LOCDS," illustrated schematically) having a sensor 98 that measures a parameter of the housing 22 (e.g., the acceleration, angular acceleration, angular velocity, position of the housing 22, etc.) and outputs a parameter signal. The controller 90 performs a protective operation (e.g., disables operation of the motor 14, reduces power supplied to the motor 14, etc.) when the measured parameter exceeds a parameter threshold for a set amount of time. The amount of time may vary depending on many factors (e.g., type of tool connected, selected operation mode, etc.).

In that regard, while the rotary hammer 10 is operating, the motor 14 (e.g., a brushless DC motor) provides a rotational output that is transmitted to tool bit 18 and the controller 90 samples the parameter signal (e.g., the angular acceleration in each of three orthogonal principal axes) of the sensor 98 to determine the measured parameter (e.g., angular acceleration about the drive axis A1 measured in radians per second-squared) of the housing 22. In other embodiments, the controller 90 may integrate the output or perform other operations to determine a measured parameter (e.g., angular velocity of the tool 1, measured in radians per second; position of the rotary hammer 10 relative to an initial position), and perform a protective operation when the measured parameter (e.g., angular velocity or the position of the rotary hammer 10) has exceeded a tool threshold (e.g., threshold velocity, or a change in position that has exceeded a threshold). In some embodiments, the controller 90 samples the rotational speed of the housing 22 every ten milliseconds, but in other embodiments this sampling frequency can be higher or lower. For example, in some embodiments, the controller 90 samples the rotational speed of the housing 22 every millisecond.

In some embodiments, the controller 90 increments or decrements a counter upon comparison of the measured parameter to the tool threshold and determination that the measured parameter has exceeded the tool threshold, and subsequently compares the counter to a counter threshold, and if the counter has exceeded the counter threshold, determines that a loss-of-control event has occurred, and performs a protective operation on the rotary hammer 10 when the counter has exceeded the counter threshold. In other embodiments, the controller 90 may instead decrease power supplied to the motor 14 to slow rotation of the motor 14.

The housing 22 supports the motor 14 which includes a rotor 102 coupled to a motor output shaft 106 that is supported within a stator 110 (e.g., via bearings 114) and is rotatable about a motor rotation axis A2. A fan 118 is coupled to the motor output shaft 106 at the first end 122 and a motor pinion 126 is coupled to the motor output shaft 106 at the second end 130. The motor pinion 126 engages a transmission input gear 134 (e.g., a bevel gear) to transfer rotation of the motor output shaft 106 to a transmission 138.

The transmission 138 includes an intermediate shaft 142 on which the transmission input gear 134, a transmission pinion 146, a rotational-output gear 150, and first and second coupling sleeves 154, 158 are supported. The transmission pinion 146 is coupled to the intermediate shaft 142 for rotation with the intermediate shaft 142 about a transmission rotation axis A3 and the rotational-output gear 150 is supported on the intermediate shaft 142 (e.g., by bearings) such that the rotational-output gear 150 is rotatable relative to, that is, independent from, the intermediate shaft 142. The first coupling sleeve 154 is supported on the transmission pinion 146 and is slidable to engage the rotational-output gear 150, coupling the rotational-output gear 150 for rotation with the intermediate shaft 142 and transmission pinion 146. The second coupling sleeve 158 is also supported on the transmission pinion 146 and is slidable relative to the transmission pinion 146 to engage an impact mechanism 162 supported on the intermediate shaft 142.

The rotational-output gear 150 engages a gear portion 166 of the spindle 170 to transfer rotation of the intermediate shaft 142 to the spindle 170, and thereby, the tool bit 18 coupled to the spindle 170 (e.g., via a chuck, quick-change collet, or other securing structure configured to receive and couple a tool bit 18 to the rotary hammer 10). Upon engagement of the first coupling sleeve 154 with the rotational-output gear 150, the rotational output of the motor 14 is transferred from the motor output shaft 106 to the intermediate shaft 142 via the transmission input gear 134, from the intermediate shaft 142 to the rotational-output gear 150 through the coupling engagement of the first coupling sleeve 154 with the transmission pinion 146 and rotational-output gear 150, and from the rotational-output gear 150 to the spindle 170 and the tool bit 18. Disengagement of the first coupling sleeve 154 from the rotational-output gear 150 disables the transfer of rotational output from the motor 14 to the tool bit 18.

The impact mechanism 162 (e.g., a wobble drive system including a wobble bearing 174) is supported on the intermediate shaft 142 between the transmission input gear 134 and the transmission pinion 146, with the rotational-output gear 150 rotatably supported on the intermediate shaft 142 in a position furthest away from the transmission input gear 134. The impact mechanism 162 is also supported on the intermediate shaft 142 (e.g., with bearings) such that it is rotatable independent of the intermediate shaft 142. The second coupling sleeve 158 slides on the transmission pinion 146 to engage the wobble bearing 174. The impact mechanism 162 further includes a cylinder 178 supported in the spindle 170 and coupled to the wobble bearing 174. The cylinder 178 is reciprocated by the wobble bearing 174, and a striker 182 supported in the cylinder 178 is reciprocated by an air cushion within the cylinder 178 between the cylinder 178 and the striker 182. The striker 182 impacts an anvil 186 supported in the spindle 170 and imparts axial impacts thereon, which are transmitted to the tool bit 18 as a hammering impact.

A mode selection dial 86 is supported on one side 26 of the housing 22 and is rotatable among a plurality of positions (P1-P4) that indicate the mode in which the rotary hammer 10 is being operated. With reference to FIGS. 3-6, the mode selection dial 86 includes first and second arms 190, 194 extending from the mode selection dial 86 and a cam 198 at least partially defined by surfaces of the mode selection dial 86 and the arms 190, 194. The arms 190, 194 engage the first and second coupling sleeves 154, 158 to translate the first and second coupling sleeves 154, 158 along the transmission pinion 146.

Figure 3:
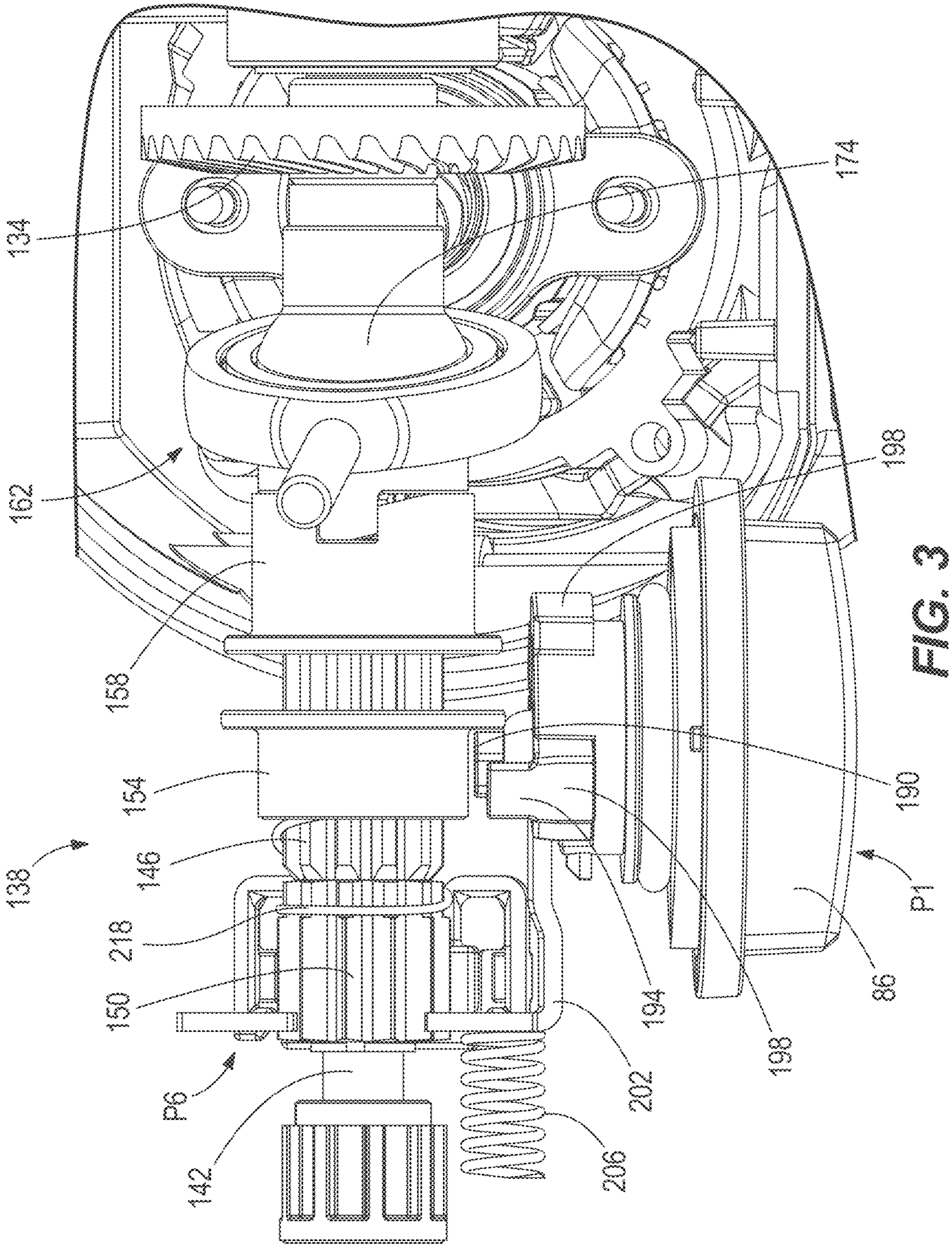
FIG. 3 is a section view of a portion of the rotary hammer of FIG. 1, including the transmission.
Figure 4:
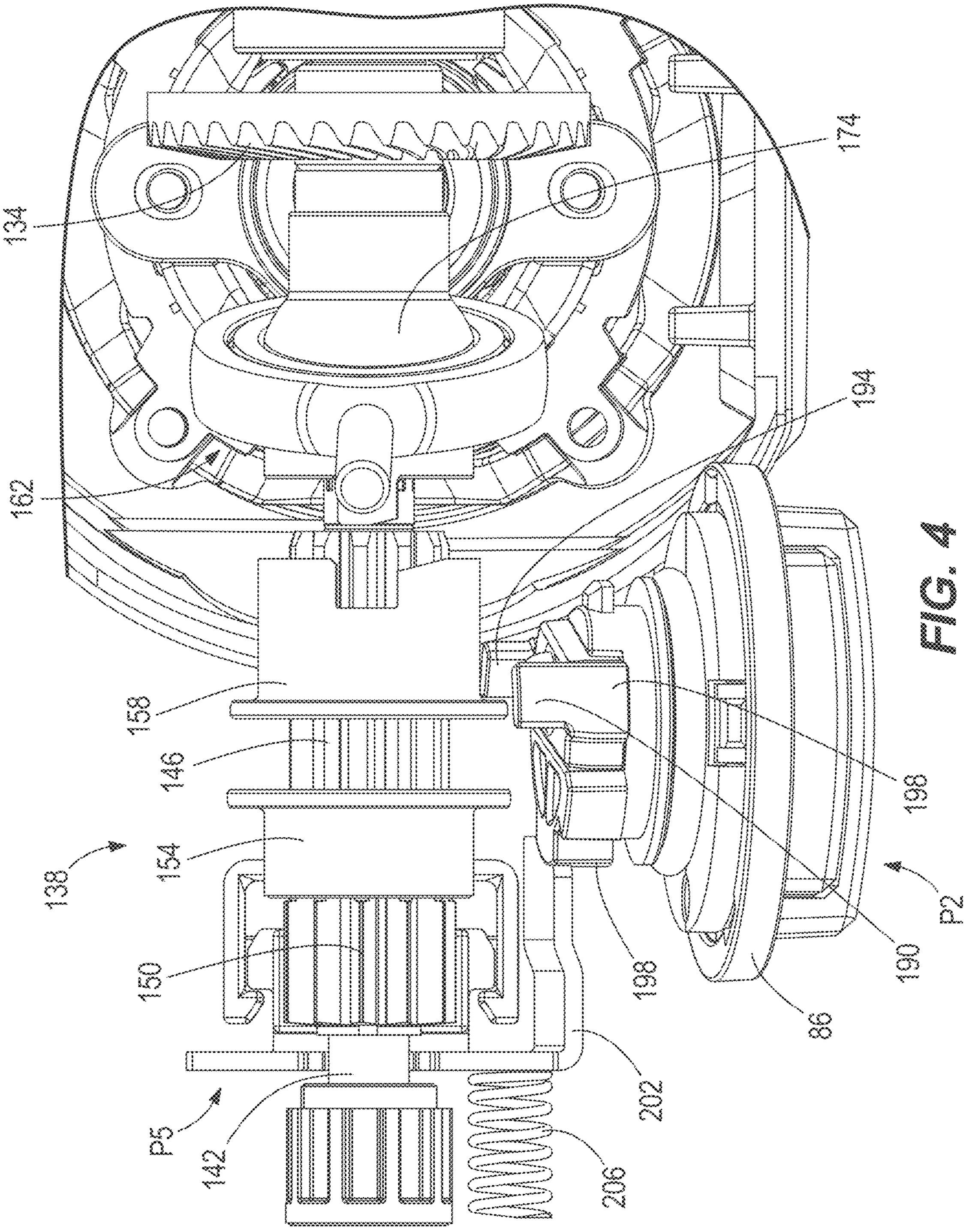
FIG. 4 is a section view of a portion of the rotary hammer of FIG. 1, including the transmission.
Figure 9:
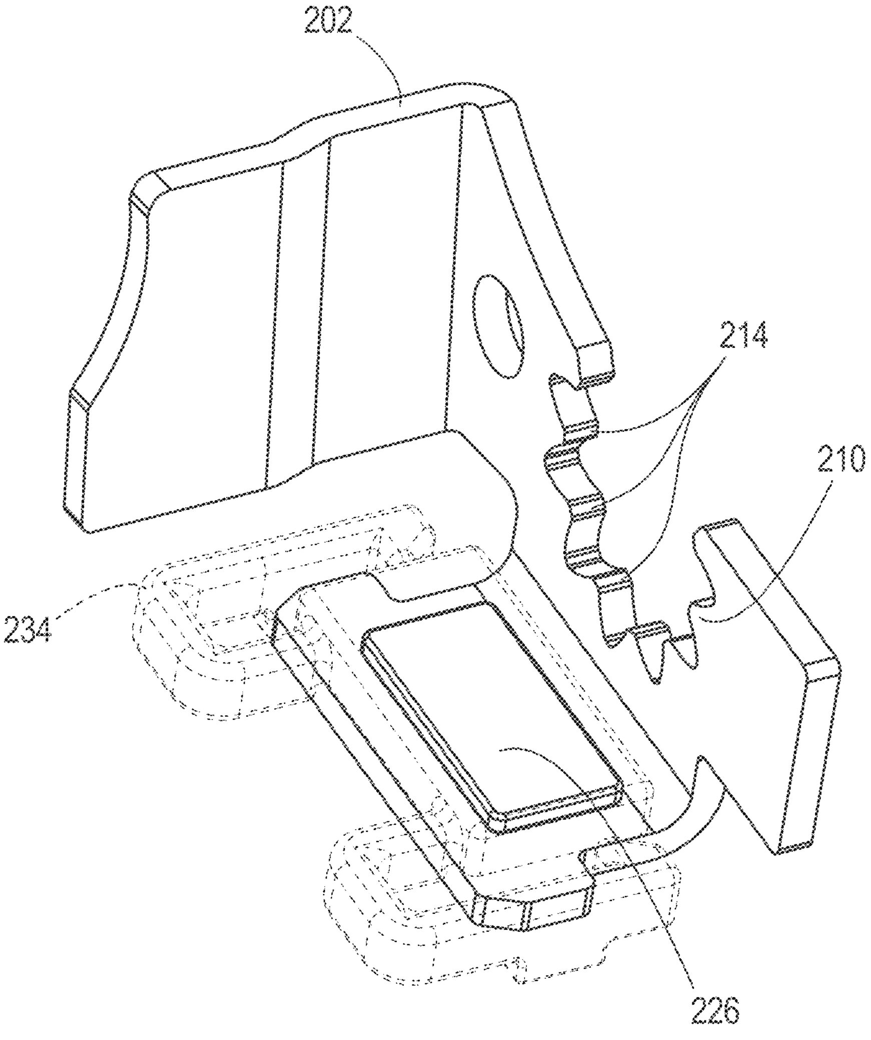
FIG. 9 is a perspective view of the operating mode detection system of the rotary hammer of FIG. 1.

A linkage 202 is supported in the housing 22 and is slidable parallel to the drive axis A1 between a first and second position P5, P6. A biasing member 206 (e.g., a compression spring) biases the linkage 202 to the second position P6 (FIG. 3). The cam 198 selectively engages the linkage 202 (e.g., by rotation of mode selection dial 86) to overcome the bias of the biasing member 206 and translate the linkage 202 to the first position P5 (FIG. 4). With reference to FIG. 9, the linkage 202 includes an engagement portion 210 having teeth 214 corresponding to the pitch of the rotational-output gear 150. Returning to FIG. 3, the linkage 202 engages the rotational-output gear 150 when the linkage 202 is in the second position P6, preventing rotation of the rotational-output gear 150, and thereby, rotation of the spindle 170.

With reference to FIG. 3, when the mode selection dial 86 is the position P1 corresponding to the first, hammer-only mode in which only a hammering operation is performed by the rotary hammer 10, the first arm 190 engages the first coupling sleeve 154 to slide the first coupling sleeve 154 along the transmission pinion 146 against the bias of a spring 218 that engages the first coupling sleeve 154 to slide the first coupling sleeve 154 out of engagement with the rotational-output gear 150. By disengaging the transmission pinion 146 and rotational-output gear 150, rotation is not transferred from the motor 14 to the spindle 170, thereby disabling rotation of the tool bit 18. The spring 218 biases the second coupling sleeve 158 along the transmission pinion 146 into engagement with the wobble bearing 174, allowing the rotational output of the motor 14 to be transferred from the intermediate shaft 142 and transmission pinion 146 to the wobble bearing 174, thereby enabling axial impact to be imparted to the tool bit 18. In the position P1 corresponding to the hammer-only mode, the cam 198 does not engage the linkage 202 and the linkage 202 is biased from the first position P5 to the second position P6 by the biasing member 206. The engagement portion 210 of the linkage 202 is brought into contact with the rotational-output gear 150 and prevents rotation of the rotational-output gear 150, and thus the spindle 170.

With reference to FIG. 4, when the mode selection dial 86 is in the position P2 corresponding to the second, drill-only mode in which only a drilling operation, or rotation of the tool bit 18 about the drive axis A1, is performed by the rotary hammer 10. The second arm 194 of the mode selection dial 86 engages the second coupling sleeve 158 to slide the second coupling sleeve 158 along the transmission pinion 146 toward the front 38 of the rotary hammer 10 and out of engagement with the wobble bearing 174. The spring 218 biases the first coupling sleeve 154 along the transmission pinion 146 into engagement with the rotational-output gear 150, to enable the transfer of rotational output from the motor 14 to the rotational-output gear 150 via the transmission pinion 146, and thereby, to the spindle 170 and tool bit 18. The cam 198 of the mode selection dial 86 engages the linkage 202 to push the linkage 202 against the force of the biasing member 206 out of engagement with the rotational-output gear 150, allowing rotation of the rotational-output gear 150.

Figure 5:
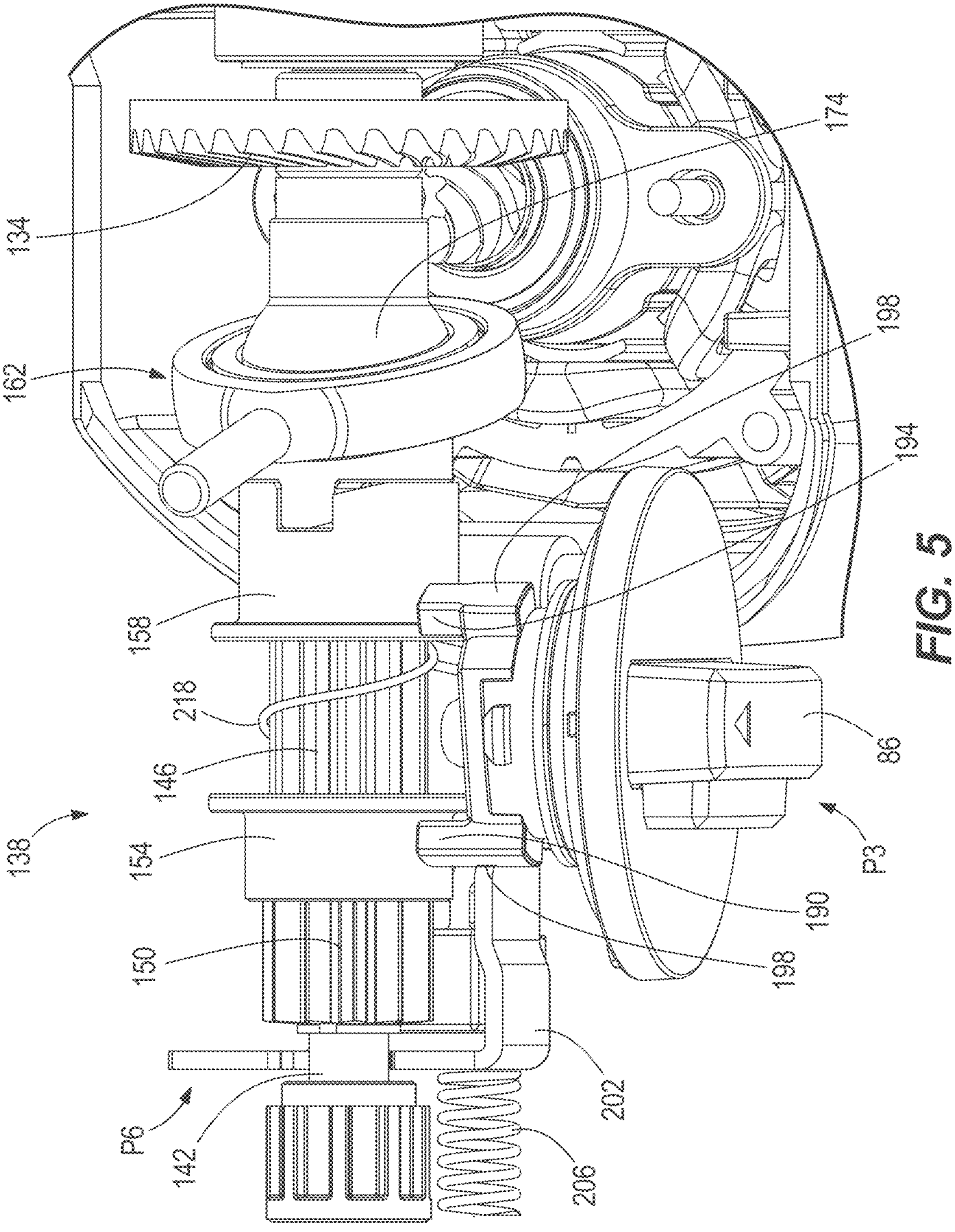
FIG. 5 is a section view of a portion of the rotary hammer of FIG. 1, including the transmission.

With reference to FIG. 5, when the mode selection dial 86 is the position P3 corresponding to the third, hammer-drill mode, in which the hammering operation and the drill operation are performed concurrently, the arms 190, 194 of the mode selection dial 86 do not engage the first and coupling sleeves 154, 158. The first coupling sleeve 154 engages the transmission pinion 146 and the rotational-output gear 150 to transfer rotation of the motor 14 to the rotational-output gear 150, the spindle 170, and the tool bit 18. The second coupling sleeve 158 engages the wobble bearing 174 and transmission pinion 146 to transfer the rotational output of the motor 14 to the wobble bearing 174 which imparts an axial impact on the tool bit 18 via the impact mechanism 162. The cam 198 biases the linkage 202 out of engagement with the rotational-output gear 150.

Figure 6:
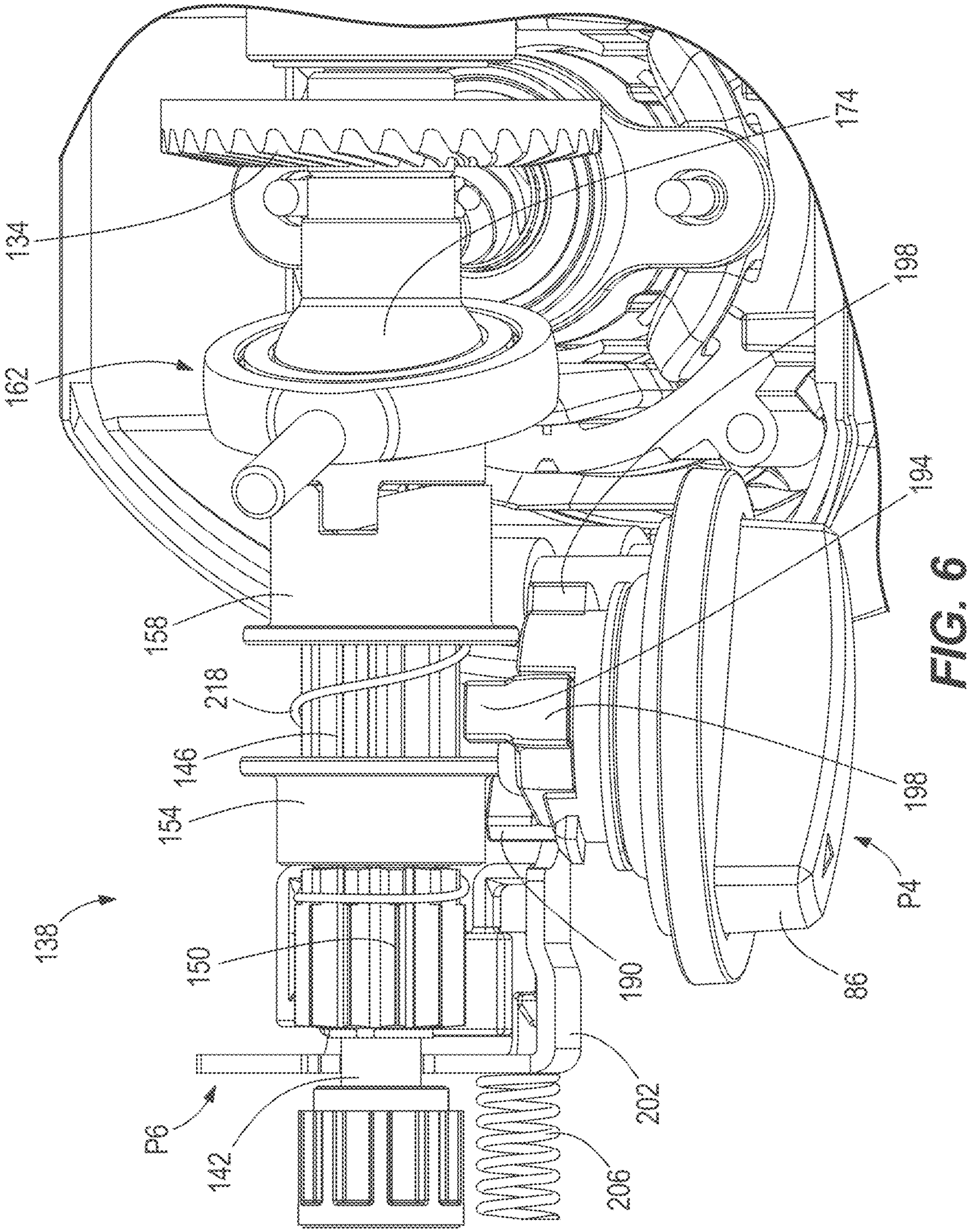
FIG. 6 is a section view of a portion of the rotary hammer of FIG. 1, including the transmission.

With reference to FIG. 6, when the mode selection dial 86 is the position P4 corresponding to the fourth, chisel-adjustment, or chisel-rotate mode, the first arm 190 of the mode selection dial 86 biases the first coupling sleeve 154 out of engagement with the rotational-output gear 150 thereby disabling the transfer of rotational output from the motor 14 to the rotational-output gear 150, spindle 170, and tool bit 18. The cam 198 is engaged with the linkage 202 to bias the linkage 202 out of engagement with the rotational-output gear 150, allowing rotation of the rotational-output gear 150 relative to the intermediate shaft 142, without consequent transfer of rotation to the transmission pinion 146. A user is able to rotate the spindle 170 and thus the tool bit 18 to position the tool bit 18 to perform an operation.

Figure 7:
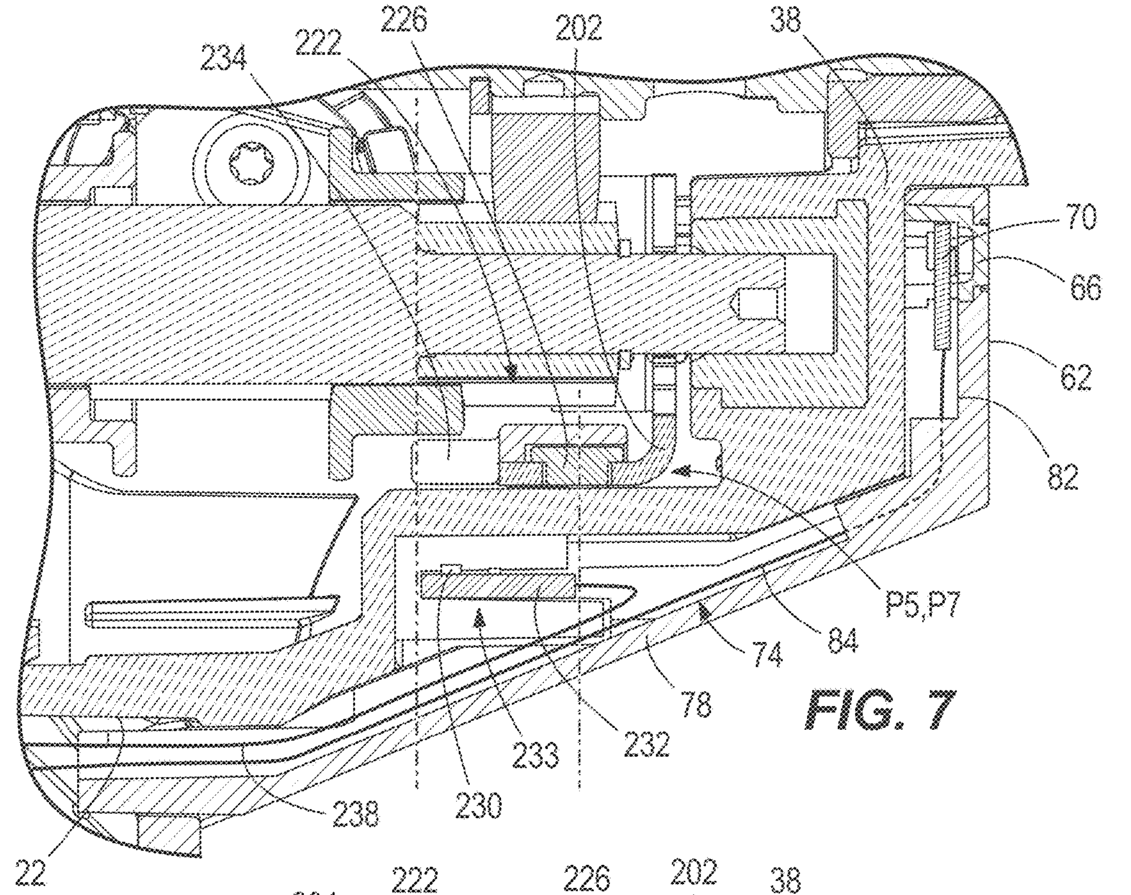
FIG. 7 is a section view of a portion of the rotary hammer of FIG. 1, including the operating mode detection system.
Figure 8:
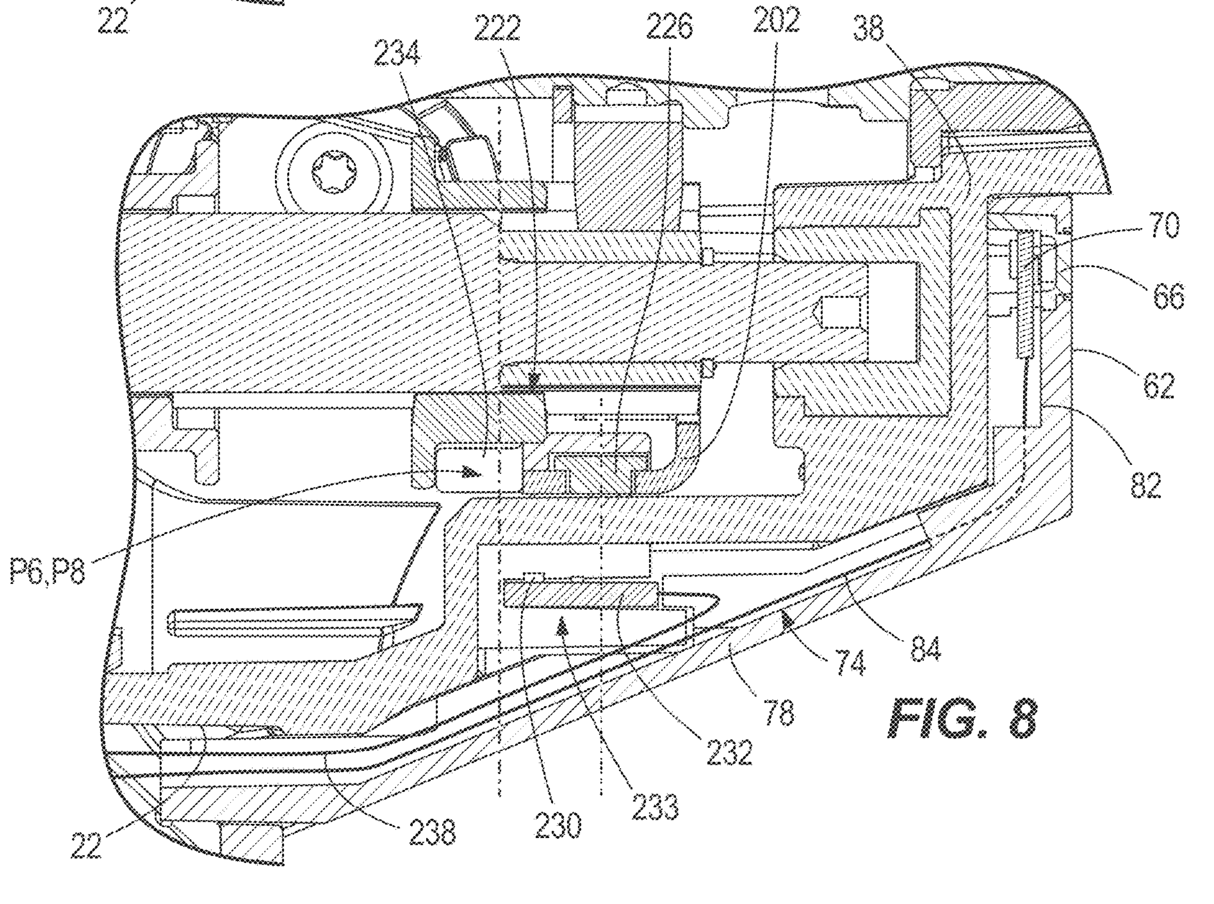
FIG. 8 is a section view of a portion of the rotary hammer of FIG. 1, including the operating mode detection system.

With reference to FIGS. 7-9, an operating mode detection system 222 is supported in the housing 22. The operating mode detection system 222 includes a magnet 226 and a Hall-effect sensor 230 on to a Hall-effect PCB 232 that senses the magnetic field of the magnet 226 and outputs an output signal that is indicative of the position of the magnet 226 relative to the Hall-effect sensor 230. In the present embodiment, the sensor is a pulse-width-modulated sensor that outputs a digital signal (i.e., a high or low value) with a duty cycle (i.e., pulse width) that is dependent on the strength of the magnetic field. In other embodiments, the sensor may be an analog sensor that outputs a signal that is linearly dependent on the strength of the magnetic field measured. In still other embodiments, the sensor may instead be a digital sensor that outputs either a high or low value, depending on the strength of the magnetic field being above, below, or within a sensor threshold.

The magnet 226 is coupled to the linkage 202 and is slidable between a third position P7 that corresponds to the first position P5 of the linkage 202 (FIG. 7), and a fourth position P8 that corresponds to the second position P6 of the linkage 202 (FIG. 8). A magnet holder 234 (FIG. 9) is coupled to the linkage 202 (e.g., in a snap fit), to maintain the position of the magnet 226 in coupled relationship with the linkage 202. In other embodiments, the magnet 226 may be coupled to the magnet holder 234 or the linkage 202 in another manner. When the linkage 202 is in the first position P5 and the magnet 226 is in the third position P7, the magnet 226 is further from the Hall-effect sensor 230 than when the linkage 202 is in the second position P6 and the magnet 226 is in the fourth position P8. The strength of the magnetic field, and therefore, the output signal, are stronger when the linkage 202 is in the second position P6 and the magnet 226 is in the fourth position P8 than when the linkage 202 is in the first position P5 and the magnet 226 is in the third position P7.

The Hall-effect PCB 232 is disposed in a receptacle 233 in the front 38 of the housing 22 and is electrically coupled to, and provides an output signal to the controller 90 via wires 238 that are disposed in the channel 74 of the lighting ring 62 alongside the power wires 84 for the LEDs 66. In another embodiment, the receptacle 233 is defined in the extension portion 78 of the lighting ring 62.

The controller 90 disables the LOCDS 94 based on the output signal from the Hall-effect sensor 230. In the present embodiment, the LOCDS 94 is operative as a default condition. That is, the LOCDS 94 is enabled unless the controller 90 has disabled the LOCDS 94. The controller 90 disables the LOCDS 94 when the output signal from the Hall-effect sensor 230 is within a sensor threshold (i.e., within a range of values corresponding to the sensor threshold). In other embodiments, the controller 90 disables the LOCDS 94 when the output signal from the Hall-effect sensor 230 is below the sensor threshold. In other embodiments, the controller 90 disables the LOCDS 94 when the output signal from the Hall-effect sensor 230 is above the sensor threshold. As the linkage 202 is translated in a direction parallel to the drive axis A1 from the first position P5 to the second position P6 and the magnet 226 is translated from the third position P7 to the fourth position P8, the strength of the magnet field increases and the output signal of the Hall-effect sensor 230 reflects the increase in the magnetic field. The controller 90 disables the LOCDS 94 when the output signal is within the sensor threshold. As the linkage 202 is translated from the second position P6 to the first position P5, and the magnet 226 from the fourth position P8 to the third position P7, the magnetic field measured by the Hall-effect sensor 230 becomes weaker, or decreases to zero magnetic field, the output signal of the Hall-effect sensor 230 reflects the decrease, and the LOCDS 94 defaults to the enabled state. Stated another way, the controller 90 disables the LOCDS 94 when the rotary hammer 10 is operated in the hammer-only and chisel adjustment modes, that is, when the rotational transmission output to the tool bit 18 is disabled. The risk of the operator losing control of the rotary hammer 10 is reduced when rotation is not transmitted to the spindle 170. It will be appreciated that, by disabling the LOCDS 94, nuisance shut-offs (e.g., protective operations in which the motor is disabled while the user maintains, that is, has not lost, control of the rotary hammer) can be eliminated.

With reference to FIGS. 10-17, a second embodiment of a rotary hammer 10' (e.g., a rotary hammer) that is operable to convert a rotational motion of a motor 14' into concurrent rotational and axial motion of a tool bit 18' along a drive axis A1 is illustrated, similar to the rotary hammer 10 above. Numbering of features differing from those above will include a prime (') designation, with like features being represented with like reference numerals.

Figure 10:
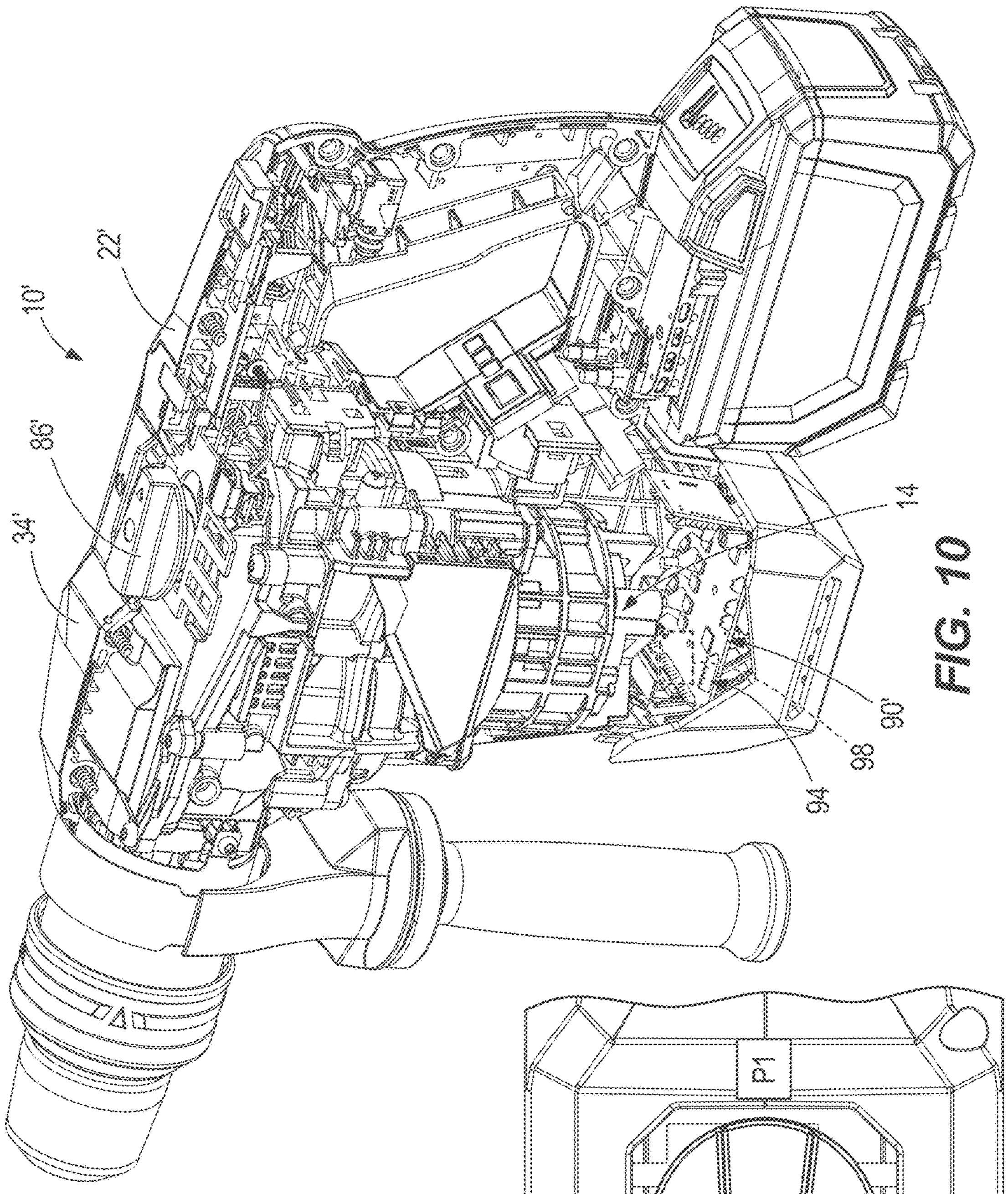
FIG. 10 is a perspective view of a section of another embodiment of a rotary hammer.
Figure 11:
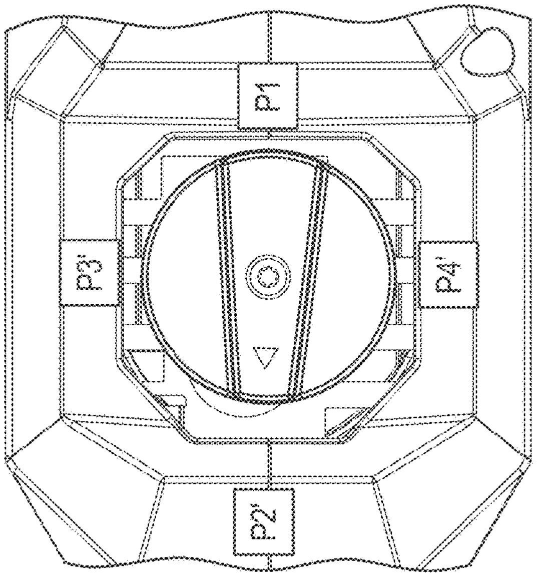
FIG. 11 is top view of the mode selection dial of the rotary hammer of FIG. 10.
Figure 12:
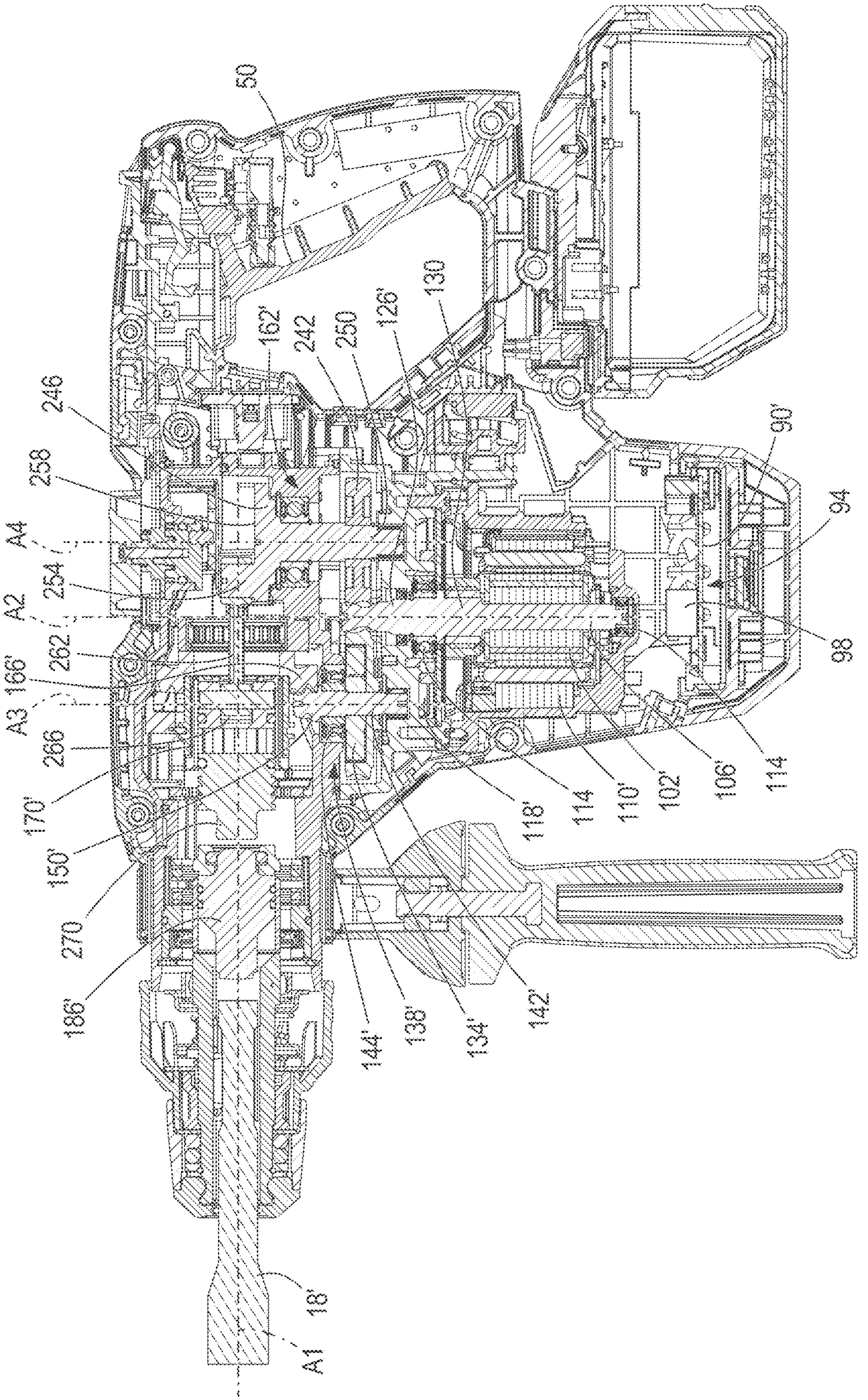
FIG. 12 is a section view of the rotary hammer of FIG. 10.

With reference to FIGS. 10-12, the illustrated rotary hammer 10' is operable in three modes: (1) a hammer-only mode in which only a hammering operation, that is, the tool bit 18' is only reciprocated along the drive axis A1, is performed by the rotary hammer 10'; (2') a hammer-drill mode, in which the hammering operation and the drill operation are performed concurrently by the rotary hammer 10'; and (3') a chisel-adjustment, or chisel rotate mode, in which the tool bit 18' is rotatable about the drive axis A1 by the user but rotational output of the motor 14' is not translated to the tool bit 18' and only the hammering operation is performed.

Instead of the mode selection dial 86' rotatably supported in a side 26' of the housing 22', the mode selection dial 86' is supported at the top 34' of the housing 22'. The mode selection dial 86' is rotatable among four positions (P1'-P4') indicative of the three operating modes.

The controller 90' is supported in the housing 22' in a direction below (i.e., toward the bottom of the page, as illustrated in FIG. 10) the motor 14', away from the mode selection dial 86'. The controller 90' is configured to control operation of the rotary hammer 10' in substantially the same manner as the first embodiment. In that regard, the controller 90' includes a LOCDS 94 (illustrated schematically) and performs a protective operation, for instance, disabling the motor 14', reducing power to the motor 14', etc., when the measured parameter of a sensor 98 exceeds a parameter threshold.

The motor 14' includes a rotor 102' coupled to a motor output shaft 106' that is rotatably supported within a stator 110' (e.g., via bearings 114). A fan 118' is coupled to the motor output shaft 106' at the second end 130 and a motor pinion 126' is also coupled to the motor output shaft 106' at the second end 130. The motor pinion 126' engages a transmission input gear 134' to transfer rotation of the motor output shaft 106' to a transmission 138' and to an impact input gear 242 to transfer rotation to the impact mechanism 162'.

The transmission 138' includes an intermediate shaft 142' on which the transmission input gear 134' is supported. The intermediate shaft 142' is rotatably supported in the housing 22' (e.g., by bearings 144') and includes a rotational-output gear portion 150' that engages a gear portion 166' of the spindle 170' to transfer rotational output of the motor 14' to the spindle 170' and tool bit 18' coupled thereto. The intermediate shaft 142' defines a transmission rotational axis A3 that is substantially parallel to the rotational axis A2 of the motor 14' and perpendicular to the drive axis A1.

The impact mechanism 162' includes the impact input gear 242 coupled to a crankshaft 246 at the first end 250 of the crankshaft 246. The crankshaft 246 includes an eccentric pin 254 at the second end 258 that is coupled to a connecting rod 262. The connecting rod 262 is coupled to a piston 266 slidably supported in the spindle 170'. Rotational output of the motor 14' is transferred to the impact mechanism 162' via the impact input gear 242, which in turn rotates the crankshaft 246 about a crankshaft axis A4. Rotation of the crankshaft 246 about the crankshaft axis A4 is transferred to the connecting rod 262 by the eccentric pin 254 which translates rotation of the motor 14' and crankshaft 246 to axial movement of the connecting rod 262, and therefore the piston 266, along the drive axis A1. The piston 266 transfers axial movement to a striker 270 supported in the spindle 170' via an air cushion between the piston 266 and striker 270, which is reciprocated along the drive axis A1 with the piston 266. The striker 270 contacts an anvil 186' to impart successive impacts on the anvil 186', and consequently, the tool bit 18'.

Figure 13:
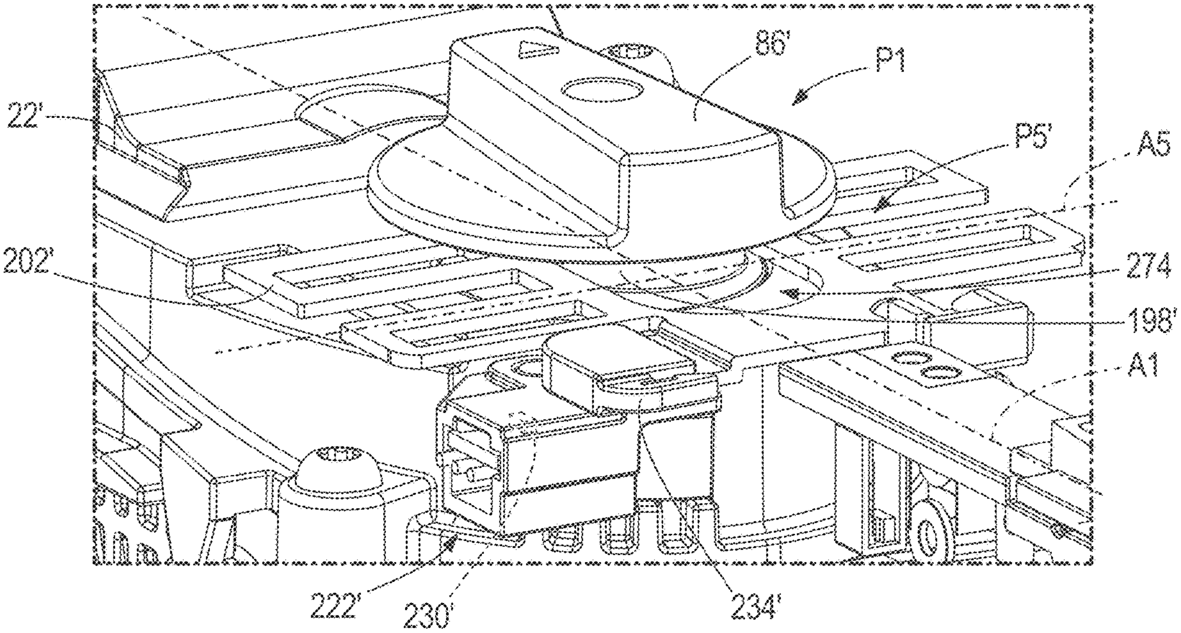
FIG. 13 is a perspective view of the rotary hammer of FIG. 10, including the operating mode detection system and mode selection dial.
Figure 14:
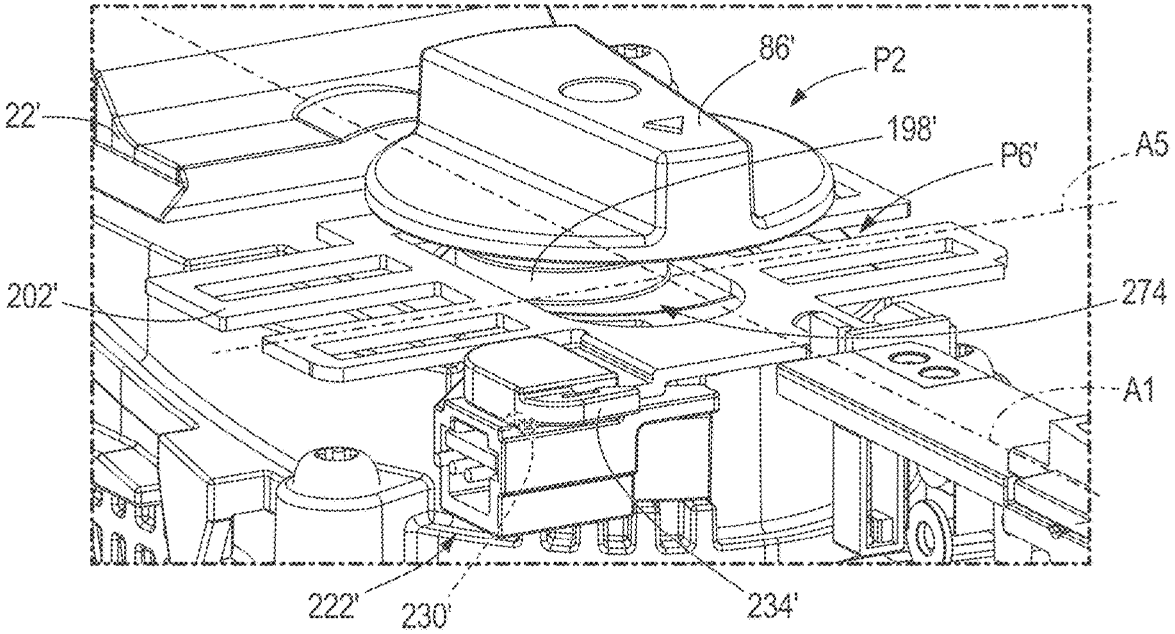
FIG. 14 is a perspective view of the rotary hammer of FIG. 10, including the operating mode detection system and mode selection dial.

With reference to FIGS. 13-14, the mode selection dial 86' includes a cam 198' that is eccentrically oriented. A linkage 202' having a central opening 274 is slidably supported in the housing 22' and the cam 198' is positioned in the central opening 274. The eccentric positioning of the cam 198' in the central opening 274 drives the linkage 202' to slide in a side-to-side direction along a linkage movement axis A5 that is perpendicular to the drive axis A1 between a first position P5', illustrated in the figures as a furthest rightward position, and a second position P6', illustrated in the figures as a furthest leftward position.

Figure 15:
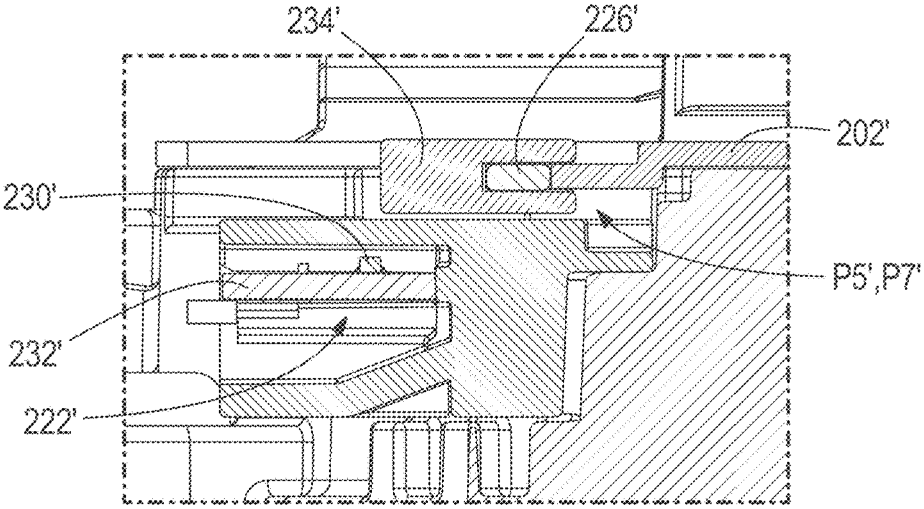
FIG. 15 is a section view of the rotary hammer of FIG. 10, including the operating mode detection system.

With reference to FIGS. 13 and 15, when the mode selection dial 86' is the position P1 corresponding to the first, hammer-only mode in which only a hammering operation is performed by the rotary hammer 10', the linkage 202' is positioned in the first, rightward position P5' by the cam 198' positioned in the central opening 274. In the hammer-only mode, rotational output to the tool bit 18' is disabled and only axial impacts are imparted to the tool bit 18'.

Figure 16:
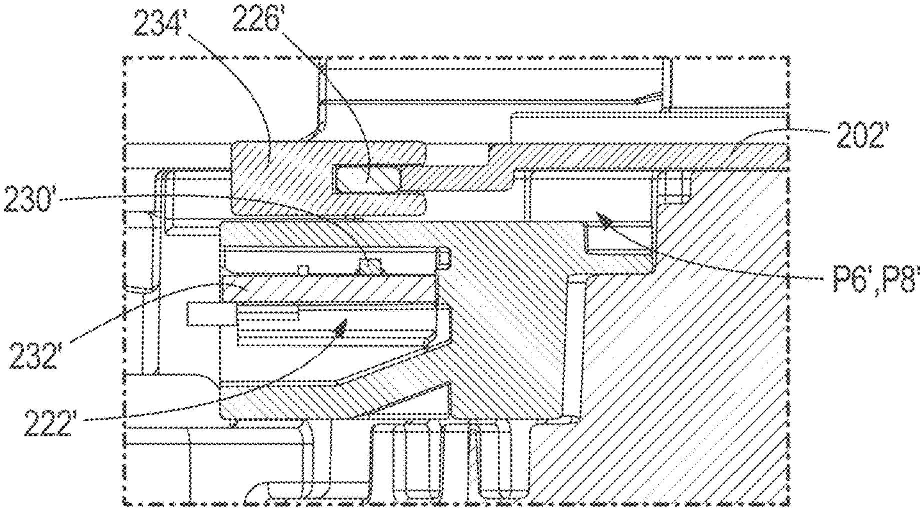
FIG. 16 is a section view of the rotary hammer of FIG. 10, including the operating mode detection system.

With reference to FIGS. 14 and 16, when the mode selection dial 86' is the position P2' corresponding to the second, hammer-drill mode, in which the hammering operation and the rotational drilling operation are performed concurrently, the linkage 202' is in the second, furthest leftward position P6' based on the position of the cam 198' in the central opening 274. In the hammer-drill mode, rotational output to the tool bit 18' is enabled, along with axial impact applied to the tool bit 18'.

Figure 17:
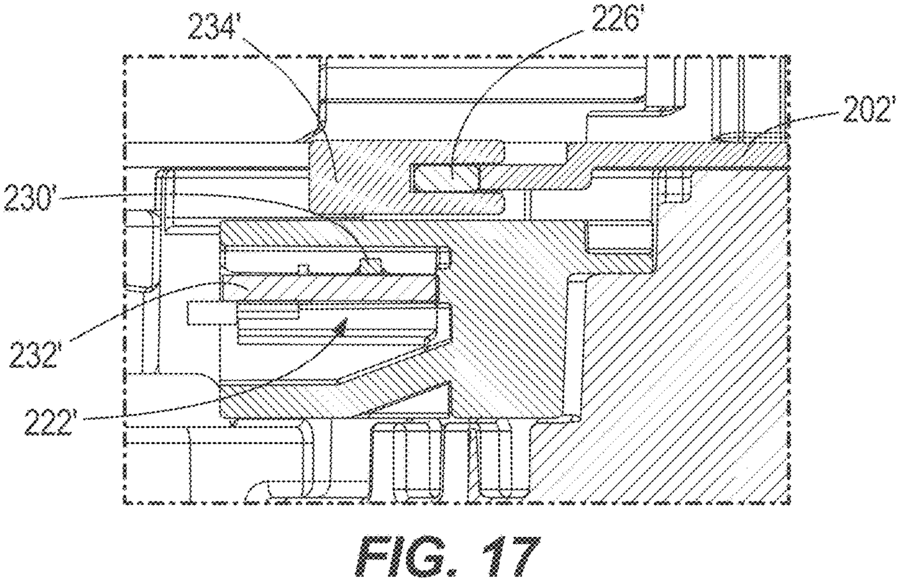
FIG. 17 is a section view of the rotary hammer of FIG. 10, including the operating mode detection system.

With reference to FIGS. 11 and 17, when the mode selection dial 86' is in the positions P3', P4' corresponding to the third, chisel-adjustment mode, the linkage 202' is positioned between the first and second positions P5', P6' based on the position of the cam 198' in the central opening 274. In the chisel adjustment mode, rotational output from the motor 14' to the tool bit 18' is disabled, but the tool bit 18' can be rotatably positioned.

With reference to FIGS. 13-17, an operating mode detection system 222' is supported in the housing 22'. The operating mode detection system 222' includes a magnet 226' and a Hall-effect sensor 230', coupled to a Hall-effect PCB 232', that operate in substantially the same manner as described for the previous embodiment.

The magnet 226' is coupled to the linkage 202' and is slidable between a third position P7' that corresponds to the first position P5' of the linkage 202' (FIGS. 13, 15), and a fourth position P8' that corresponds to the second position P6' of the linkage 202' (FIGS. 14, 16). A magnet holder 234' is coupled to the linkage 202' (e.g., in a snap fit), to maintain the position of the magnet 226' in coupled relationship with the linkage 202'.

The Hall-effect sensor 230' is coupled to housing 22' the adjacent the linkage 202'. The Hall-effect sensor 230' provides an output signal to the controller 90'. When the linkage 202' is in the first position P5' and the magnet 226' is in the third position P7', the magnet 226' is further from the Hall-effect sensor 230' than when the linkage 202' is in the second position P6' and the magnet 226' is in the fourth position P8'. The strength of the magnetic field, and therefore, the output signal, are stronger when the linkage 202' is in the second position P6' and the magnet 226' is in the fourth position P8' than when the linkage 202' is in the first position P5' and the magnet 226' is in the third position P7'.

The controller 90' enables the LOCDS 94' based on the output signal from the Hall-effect sensor 230'. In the present embodiment, the LOCDS 94' is disabled as a default condition. That is, the LOCDS 94' is disabled unless the controller 90' has enabled the LOCDS 94'. Stated another way, the controller 90 enables the LOCDS 94 when the rotary hammer 10 is operated in the rotary hammer mode, that is, when the rotational transmission output to the tool bit 18 is enabled; the LOCDS 94 is disabled when transmission rotational output to the tool bit 18 is disabled. The controller 90' enables the LOCDS 94' when the output signal from the Hall-effect sensor 230' is within a sensor threshold. As the linkage 202' is translated in along the linkage movement axis A5 perpendicular to the drive axis A1 from the first position P5' to the second position P6' and the magnet 226' is translated from the third position P7' to the fourth position P8', the strength of the magnetic field increases and the output signal of the Hall-effect sensor 230' reflects the increase in the magnetic field. The controller 90' enables the LOCDS 94' when the output signal is within the sensor threshold. As the linkage 202' is translated from the second position P6' to the first position P5', and the magnet 226' from the fourth position P8' to the third position P7', the magnetic field measured by the Hall-effect sensor 230' becomes weaker, or decreases to zero magnetic field, and the output signal of the Hall-effect sensor 230' reflects the decrease, and the LOCDS 94' returns to the default disabled state.

The controller 90, 90' of any of the previous embodiments may control other tool parameters based on the output signal from the Hall-effect sensor 230, 230'. In one embodiment, the rotational direction of the motor 14, 14' can be controlled by the controller 90, 90' based on the output signal received from the Hall-effect sensor 230, 230'. That is, when the Hall-effect sensor 230, 230' provides a signal indicative of the rotary hammer 10, 10' operating in the hammer-only mode, the controller 90, 90' enable motor rotation in only one direction. In another embodiment, the trigger 50 is a variable-speed trigger whereby the rotational speed of the motor 14, 14' is increased as the trigger 50 is depressed a greater distance, and the trigger mapping is modified by the controller 90, 90' based on the output signal of the Hall-effect sensor 230, 230'. For instance, when the controller 90, 90' determines the rotary hammer 10, 10' is operating in the hammer-only mode based on the output signal from the Hall-effect sensor 230, 230', the controller 90, 90' operates the motor 14, 14' at a maximum rotational speed when the trigger 50 has been depressed a smaller amount than when the rotary hammer 10, 10' is operating in another mode (e.g., drill only mode, rotary-hammer mode). Stated another way, the motor 14, 14' is operated at the maximum rotational speed with a greater trigger displacement in one operating mode than in a different operating mode. As an example, when the rotary hammer 10, 10' is operated in the hammer-only mode, the motor 14, 14' may be operated at the maximum rotational speed when the trigger 50 has been depressed fifty percent of the maximum trigger displacement, and when the rotary hammer 10, 10' is operated in other modes, the motor 14, 14' may be operated at the maximum rotational speed when the trigger 50 has been depressed seventy-five percent of the maximum trigger displacement. In other embodiments, different trigger mapping may be used, for instance, different trigger displacement percentages, different operating modes, etc. In other embodiments, the controller 90, 90' may operate other parameters of the rotary hammer 10, 10' in a different manner depending on the output signal from the Hall-effect sensor 230, 230'.

Although the subject matter has been described in detail with reference to certain preferred embodiments, variations and modifications exist within the scope and spirit of one or more independent aspects of the subject matter as described.

Various features of the subject matter are set forth in the following claims.

What is claimed is:

1. A rotary hammer operable in a first mode in which only a hammering operation to reciprocate a tool bit along a drive axis is performed and a second mode in which the tool bit is rotationally driven about the drive axis, the rotary hammer comprising:

a housing;

a mode selection dial supported in the housing and moveable among a plurality of positions indicative of the first mode and the second mode, the mode selection dial including a cam;

a motor supported in the housing, the motor providing a rotational output;

a linkage supported in the housing and moveable between a first position and a second position in response to engagement by the cam;

a loss-of-control detection system configured to measure acceleration of the housing and disable the motor upon the acceleration exceeding an acceleration threshold; and an operating mode detection system supported in the housing, the operating mode detection system including:

a magnet coupled to the linkage and moveable therewith between a third position corresponding to the first position of the linkage and a fourth position corresponding to the second position of the linkage, and a Hall-effect sensor coupled to the housing, the Hall-effect sensor providing an output signal indicative of a position of the magnet, wherein the loss-of-control detection system is selectively disabled based upon the output signal.

2. The rotary hammer of claim 1, wherein the operating mode detection system further includes a magnet holder coupled to the linkage, the magnet holder securing the magnet to the linkage.

3. The rotary hammer of claim 2, wherein the magnet holder is coupled to the linkage via a snap fit.

4. The rotary hammer of claim 1, further comprising a controller configured to operate the loss-of-control detection system, wherein the controller is coupled to the Hall-effect sensor by a first wire, and wherein the housing defines a channel in which the first wire is at least partially disposed.

5. The rotary hammer of claim 4, further comprising a lighting ring disposed at a front side of the housing and electrically connected to the controller by a second wire, wherein the second wire is at least partially disposed within the channel with the first wire.

6. The rotary hammer of claim 1, wherein the mode selection dial is supported on a side of the housing.

7. The rotary hammer of claim 1, wherein the mode selection dial is supported on a top of the housing.

8. The rotary hammer of claim 1, wherein the linkage is movable in a direction parallel to the drive axis.

9. The rotary hammer of claim 1, further comprising:

an intermediate shaft defining a rotational axis, the intermediate shaft supported in the housing such that the rotational axis is perpendicular to the motor rotational output and parallel to the drive axis, the intermediate shaft receiving the rotational output from the motor;

a pinion coupled to the intermediate shaft and rotatable therewith;

a rotational-output gear supported on the intermediate shaft and rotatable relative thereto, the rotational-output gear configured to provide a rotational output to the tool bit, the linkage engageable with the rotational-output gear in the second position; and a coupling sleeve slidably disposed on the pinion and selectively engageable with the rotational-output gear to transmit rotation from the pinion to the rotational-output gear, wherein the mode selection dial engages the coupling sleeve to slide the coupling sleeve along the pinion out of engagement with the rotational-output gear concurrently with the linkage moving to the second position thereby engaging the rotational-output gear and disabling rotational output to the tool bit.

10. The rotary hammer of claim 1, wherein the loss-of-control detection system is disabled when the output signal is within a sensor threshold.

11. The rotary hammer of claim 1, wherein the fourth position is closer to the Hall-effect sensor than the third position, and wherein the loss-of-control detection system is enabled when the magnet is closer to the third position.

12. A rotary hammer operable in a first mode in which only a hammering operation to reciprocate a tool bit along a drive axis is performed and a second mode in which the tool bit is rotationally driven about the drive axis, the rotary hammer comprising:

a housing;

a sensor coupled to the housing and configured to provide a parameter signal indicative of a measured parameter of the housing about the drive axis;

a mode selection dial supported in the housing and movable among a plurality of positions indicative of the first mode and the second mode, the mode selection dial including a cam;

a motor supported in the housing, the motor providing a rotational output;

a transmission supported in the housing and configured to receive the rotational output from the motor, the transmission configured to selectively provide a rotational transmission output to the tool bit;

a linkage supported in the housing and moveable between a first position and a second position in response to engagement by the cam;

a controller including a loss-of-control detection system configured to receive the parameter signal and compare the parameter signal to a parameter threshold, the controller operable to disable the motor upon the parameter signal exceeding the parameter threshold; and an operating mode detection system including:

a magnet coupled to the linkage and movable therewith, and a Hall-effect sensor coupled to the housing, the Hall-effect sensor providing an output signal indicative of a position of the magnet, wherein the loss-of-control detection system is disabled upon disabling of the rotational transmission output to the tool bit.

13. The rotary hammer of claim 12, wherein the transmission includes:

an intermediate shaft defining a rotational axis, the intermediate shaft supported in the housing such that the rotational axis is perpendicular to the motor rotational output and parallel to the drive axis, the intermediate shaft receiving the rotational output from the motor;

a pinion coupled to the intermediate shaft and rotatable therewith;

a rotational-output gear supported on the intermediate shaft and rotatable relative thereto, the rotational-output gear configured to provide a rotational output to the tool bit; and a coupling sleeve slidably disposed on the pinion and selectively engageable with the rotational-output gear to transmit rotation from the pinion to the rotational-output gear, wherein the linkage is slidable in a direction parallel to the rotational axis and engageable with the rotational-output gear in the second position, and wherein the mode selection dial engages the coupling sleeve to slide the coupling sleeve along the pinion out of engagement with the rotational-output gear concurrently with the linkage moving to the second position thereby engaging the rotational-output gear and disabling rotational output to the tool bit.

14. The rotary hammer of claim 13, wherein the linkage is movable in a direction perpendicular to the drive axis.

15. The rotary hammer of claim 12, wherein the loss-of-control detection system is disabled when the output signal is within a sensor threshold.

16. The rotary hammer of claim 12, wherein the housing includes a lighting ring disposed at a front side of the housing, the lighting ring defining a channel therein extending away from the tool bit, the Hall-effect sensor coupled to the housing adjacent to the channel.

17. The rotary hammer of claim 12, wherein the operating mode detection system further includes a magnet holder coupled to the linkage, the magnet holder maintaining the magnet in coupled relation with the linkage.

18. A rotary hammer comprising:

a housing;

a mode selection dial supported in the housing and rotatable among a plurality of positions indicative of a plurality of modes including a first mode in which only a hammering operation to reciprocate a tool bit along a drive axis is performed and a second mode in which only a drilling operation to rotate the tool bit about the drive axis is performed, the mode selection dial including a cam;

a motor supported in the housing and providing a rotational output;

an impact mechanism supported in the housing and configured to receive the rotational output from the motor and transfer the rotational output to successive reciprocations thereby performing the first mode, the impact mechanism selectively activatable by the mode selection dial;

a linkage supported in the housing and moveable between a first position and a second position based upon engagement by the cam;

a controller including a loss-of-control detection system configured to disable the motor upon acceleration of the housing exceeding an acceleration threshold; and an operating mode detection system including:

a magnet coupled to the linkage and moveable therewith, and a Hall-effect sensor coupled to the housing, the Hall-effect sensor providing an output signal to the controller indicative of a position of the magnet, wherein the Hall-effect sensor is closer to the magnet when the linkage is in the second position than when the linkage is in the first position.

19. The rotary hammer of claim 18, wherein the output signal is useable by the controller to control a rotational direction of the motor.

20. The rotary hammer of claim 19, wherein the output signal is useable by the controller to control rotational speed of the motor.

* * * * *